Fig.1

Feb. 17, 1959 W. K. GRIFFIN, JR., ET AL 2,873,717
APPARATUS FOR APPLYING ADHESIVE TO PREDETERMINED
AREAS OF A SERIES OF ARTICLES
Filed July 7, 1953 8 Sheets-Sheet 2

United States Patent Office 2,873,717
Patented Feb. 17, 1959

2,873,717
APPARATUS FOR APPLYING ADHESIVE TO PREDETERMINED AREAS OF A SERIES OF ARTICLES

William K. Griffin, Jr., and John F. Killion, Philadelphia, Pa., assignors, by mesne assignments, to Food Machinery and Chemical Corporation, San Jose, Calif., a corporation of Delaware Application July 7, 1953, Serial No. 366,452

12 Claims. (Cl. 118—204)

This invention relates to improved apparatus for applying adhesive to predetermined or desired areas of a series of articles and has for an object the provision of novel apparatus for applying a predetermined pattern of adhesive to a series of articles moving in succession along a path in accordance with a predetermined pitch.

This invention is particularly applicable to applying adhesive to desired areas of flaps of cartons or like receptacles, preparatory to closing and sealing, such as disclosed in the First et al. Patent No. 2,293,498. In the aforesaid patent, adhesive is applied to the entire overlapping surfaces of carton flaps and thus when the flaps are folded to close the ends of the carton there is presented at the interior of the carton a glue coated surface of substantial area. Machines generally of the type in the aforesaid patent are designed for continuous operation and rapidly open the cartons from a flat folded position, apply adhesive to the bottom flaps of the carton and then seal them, followed by filling the carton with the desired product, after which the top flaps of the carton have adhesive applied to them and are then sealed to close the carton. Such machines are generally operated at speeds in the order of 200 to 300 cartons per minute. With operating speeds of this order, it is not possible for the adhesive, that is applied to the end flaps and which when in folded position present an adhesive coated surface at the interior of the carton, to have a sufficient time to become set or dry at the time the product is discharged into the cartons. Accordingly, the glued surface on the flaps when in their folded closed positions present on unset or wet adhesive surface with respect to the interior of the carton. While generally this does not represent a serious disadvantage in regard to products that are not readily contaminated by the unset or wet adhesive, such for example as soap flakes, powders, granules and the like, or non-edible products, nevertheless, it does present a serious disadvantage if the cartons are to be filled with food products such as breakfast food and the like. Even in the cartons, receiving non-edible products, it has not been possible to include in the cartons before the fill any enclosures, such as coupons or the like, that would adhere to the adhesive coated interior surface of the flaps and thus be subject to damage when removed from the carton by a purchaser.

In accordance with this invention there is provided a novel arrangement for applying a predetermined adhesive pattern to a series of moving articles which comprises means for feeding the articles in succession along a path in accordance with a predetermined pitch, applying a coating of adhesive to a surface, means for removing the adhesive coating from the surface in accordance with a predetermined adhesive pattern at locations corresponding to the pitch of the articles, and means for effecting engagement successively between the articles and the surface to transfer the adhesive in predetermined pattern to the articles.

Further in accordance with the invention there is provided in a system for conditioning cartons preparatory to closing, a conveyor for moving cartons each having end flaps extending therefrom, and means including scraper structure for applying a predetermined pattern of adhesive to the end flaps of the cartons so as to seal the cartons when the end flaps are closed while providing a substantially continuous non-adhesive surface at the inside of the carton, the predetermined pattern being controlled by the scraper structure operating in timed relation to movement of the cartons by the conveyor.

More particularly, and further in accordance with the invention, there is provided a continuously moving conveyor for a succession of cartons arranged on said conveyor in a spaced series of a given pitch. The cartons each have end flaps extending therefrom, and the conveyor is adapted to advance the cartons successively to and past an adhesive applying station at a predetermined linear velocity. At the adhesive applying station, there is provided a rotating adhesive conveyor, the circumference of which is directly related to the pitch of the cartons on the carton conveyor. The adhesive conveyor cooperates with scraper structure for applying a predetermined pattern of adhesive to the end flaps of the cartons so as to seal the cartons when the end flaps are closed while providing a substantially continuous non-adhesive surface at the inside of the carton, the predetermined pattern being controlled by the scraper structure operating on the adhesive conveyor in accordance with the pitch of the cartons on the carton conveyor.

By applying adhesive only to predetermined areas of the end flaps on cartons, in accordance with this invention, it is possible to provide a subtantially continuous non-adhesive surface at the inside of the carton. Thus there is minimized the aforementioned contamination problem, and many products that have heretofore been incapable of packaging on machines of the aforesaid type may now be packaged on such machines without damage to the product. Additionally, it is now possible with this invention to place a coupon, or other enclosures, in the cartons before the product is discharged into them without danger of the coupon or other enclosures adhering to the carton flaps.

This invention has a further advantage from a cost standpoint. It will be recalled that cartoning machines of the aforesaid type are capable of filling and sealing from 200 to 300 cartons per minute. As this invention contemplates the removal and reuse of adhesive from undesired areas of the flaps at either or both ends of the carton, within only a relatively short operating period of one year, for example, the saving in adhesive will amount to as much as several thousands of dollars per machine.

Unlike the Rider Patent No. 1,932,989 that employed a scraper for removing adhesive from predetermined areas of a roller preparatory to engaging the area of intermittently fed wrappers or other sheet material in the flat, this invention provides methods of and apparatus for applying adhesive to a series of continuously and rapidly moving articles, such as partially folded cartons, having a predetermined pitch on a conveyor and wherein there is a definite relation between the circumference of the adhesive transfer roller and the pitch of the articles to receive the predetermined pattern of adhesive. Unlike said Rider patent this invention provides means for accurately and concurrently or selectively adjusting the spacing between each of the ends of the doctor roll and the adhesive transfer roll to accurately control the thickness of the adhesive coating applied to the transfer roll, such adjustments readily being made from the same exterior side of the machine and thus easily accessible to the operator.

Unlike said Rider patent that was concerned only with sheet material or wrappers in the flat, this invention provides novel structure for applying a predetermined pattern of adhesive to the top flaps of a filled carton in a manner to prevent any adhesive from being spilled into the carton and thus contaminating the filled product. In the aforesaid First et al. patent adhesive was applied to the entire surface of the carton flaps. Thus there was not presented there the problem solved in novel manner here by applicants of disposing of the excess adhesive removed from the transfer roll in forming thereon a predetermined pattern of adhesive to be transferred to the top flaps of the cartons.

For a more detailed disclosure of the invention and for further objects and advantages thereof reference is to be had to the following description taken in conjunction with the accompanying drawings in which.

Figure 1:
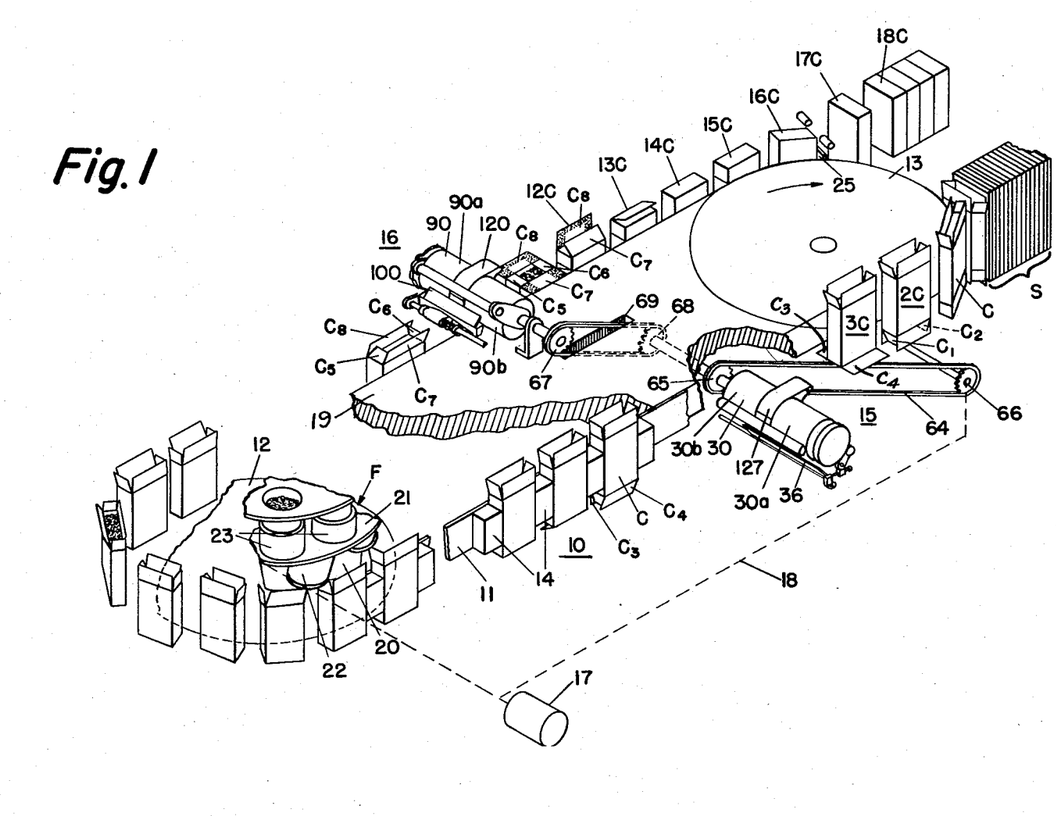
Fig. 1 in perspective, diagrammatically illustrates the invention as applied to a system for sealing and filling cartons.

Referring to the drawings there is diagrammatically shown in Fig. 1 apparatus for performing the various operations upon cartons by a machine generally of the type disclosed in Delamere et al., Patent No. 1,527,030, and in said First et al., Patent No. 2,293,498. The flattened cartons C are successively removed from a stack S, opened by mechanism preferably of the type disclosed in First et al., Patent No. 2,318,208, and delivered to an endless conveyor 10, comprising a moving belt 11, and blocks 14, which passes around the drums 12 and 13, the blocks 14 extending from belt 11 to form a series of pockets of predetermined pitch on conveyor 10 for the reception of the cartons C. Drum 12 is driven from a suitable source of power indicated by motor 17 drum 12 in turn driving belt 11; drum 13 is mechanically driven by belt 11.

As each opened carton moves through the position of carton 2C its bottom flaps C1 and C2 are turned upwardly and inwardly and its bottom flaps C3 and C4 are bent upwardly and outwardly as illustrated by carton 3C, so that as the carton moves over the lower selective adhesive applying mechanism 15, adhesive will be applied to the under faces of flaps C3 and C4 in a predetermined pattern on desired areas, as hereinafter more fully described.

As each carton moves beyond the lower selective adhesive applying mechanism 15, its flap C3 is turned downwardly and then inwardly and upwardly, into engagement with flaps C1 and C2 and finally the flap C4 is moved into overlying adhesive engagement with flap C3. Thus the flap C4 is the outermost flap of the formed carton bottom.

Each of the cartons, then, in turn, passes through a filling station F for filling by mechanism preferably of the type described and claimed in First et al., Patent No. 2,320,581. During passage of the cartons through the filling station the open upper end of each carton temporarily receives a filling snout 20 depending from the rotating plate 21. At a predetermined position of each carton, a gate 22 supported by plate 21 for movement between the associated filling snout 20 and a measuring flask 23, swings outwardly to allow the charge of filling material within the flask 23 to fall into the carton.

As each carton moves beyond the filling station F, its top flaps C5 and C6 are turned inwardly toward each other and its top flaps C7 and C8 are swung outwardly away from each other for application of adhesive to the then turned-up faces of flaps C7 and C8 by the upper selective adhesive applying mechanism 16 as the carton is moved by conveyor 10 beneath mechanism 16. Thereafter, the flaps C7 and C8 are folded over to form the closed top of the carton as it is advanced through the positions of cartons 12C—14C.

As each closed carton passes beyond the drum 13, moving away therefrom tangentially it engages a stop member 25 which coacts with pressure applying belts to turn the carton through a right angle movement of the filled cartons with their broad faces or sides parallel to each other for transport by and between pressure applying belts all as fully described and claimed in said Patent No. 2,293,498.

Figures 2, 3:
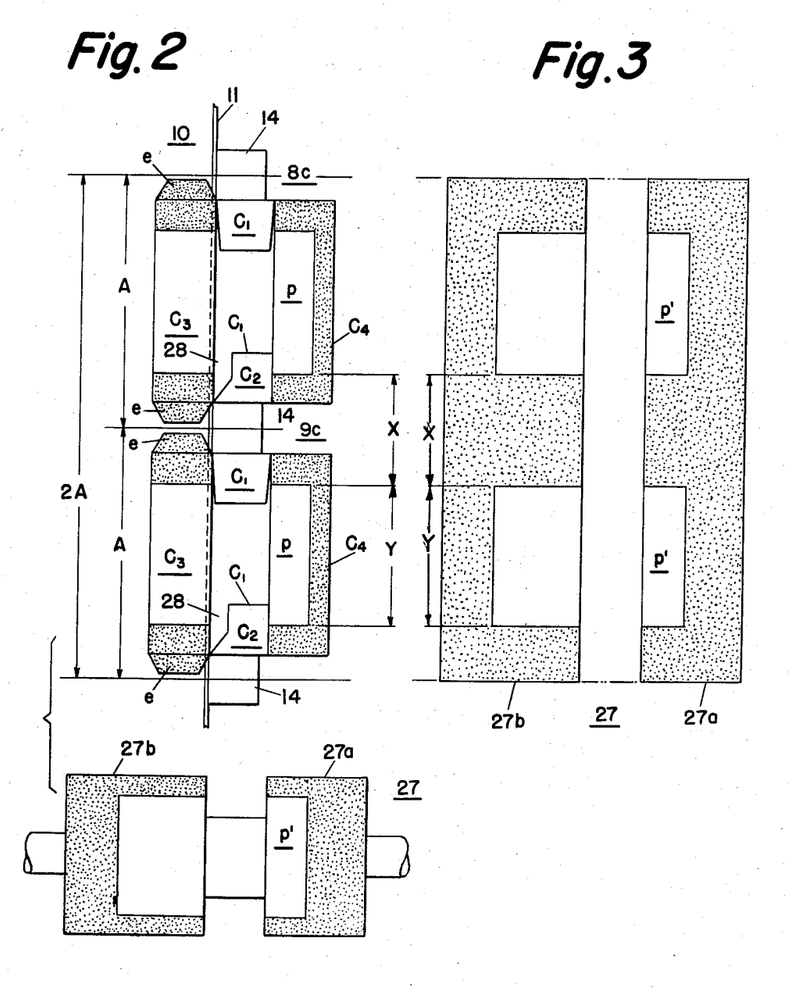
Fig. 2 is an explanatory diagram useful in explaining the invention and shows the ends of a pair of cartons disposed at a predetermined pitch on a conveyor with adhesive applied to their extended end flaps in predetermined areas by an associated transfer roller.
Fig. 3 is another explanatory diagram representing the complete peripheral surface of the transfer roller of Fig. 2 with a predetermined pattern of adhesive thereon.

Referring to Fig. 2 there are shown for explanatory purposes two cartons 8C and 9C to which a predetermined pattern of adhesive has been applied by the adhesive applying member shown as roller 27. The roller 27 is divided into two portions 27a and 27b, from which the adhesive has been removed at desired areas, as hereinafter described. Each of the selective adhesive applying mechanisms 15 and 16 of Fig. 1 includes a roller, 30 and 90 respectively, similar to roller 27. In Fig. 3 the circumferential surface of roller 27 has been shown in the flat, for explanatory purposes, to illustrate the pattern of adhesive applied to surface of roller 27 and to be transferred to two successive cartons. The cartons 8C and 9C have a pitch determined by the spacer blocks 14, that separate one carton from another and form the pockets on conveyor 10. It will be observed that the adhesive pattern on the surface of roller 27 has the same pitch as the cartons on the conveyor 10. Thus the circumference of roller 27 is directly related to the pitch of the cartons on the conveyor 10. While the roller 27 has been illustrated, for explanatory purposes, as having a circumference corresponding to two conveyor block pitches for two cartons, it is to be understood that the diameter of the roller 27 may be made larger to equal three, four or more conveyor block pitches as desired.

The adhesive pattern applied to flaps C3 and C4 in Fig. 2 is such that when the flaps are folded to closed position they will present a substantially continuous non-adhesive surface at the inside of the carton. The only portion of adhesive that will be exposed to the inside of the carton will be the small corner area 28 which results from the notch being cut from flap C1. In cartons of the type that do not have the notch 28 cut from flap C1, there is presented a continuous non-adhesive surface at the inside of the carton. While the adhesive patterns have been discussed above as being applied to the bottom flaps C3 and C4 of the cartons, it is to be understood that the same or a different adhesive pattern may be applied to the top flaps C7 and C8 by the upper selective adhesive applying mechanism 16.

Figure 4:
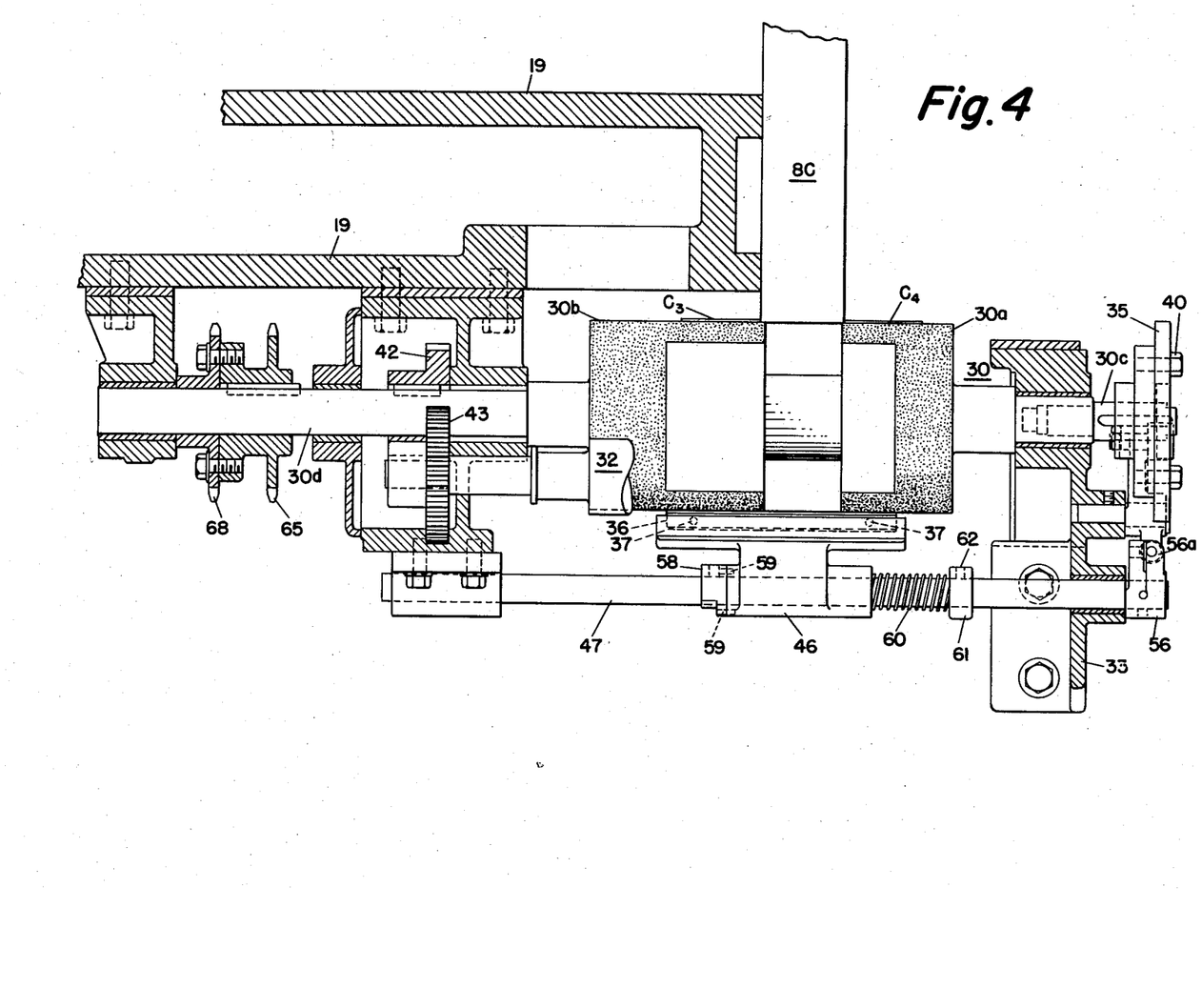
Fig. 4 is an enlarged sectional view of the selective gluing apparatus for the lower end flaps of cartons shown in Fig. 1.
Figure 5:
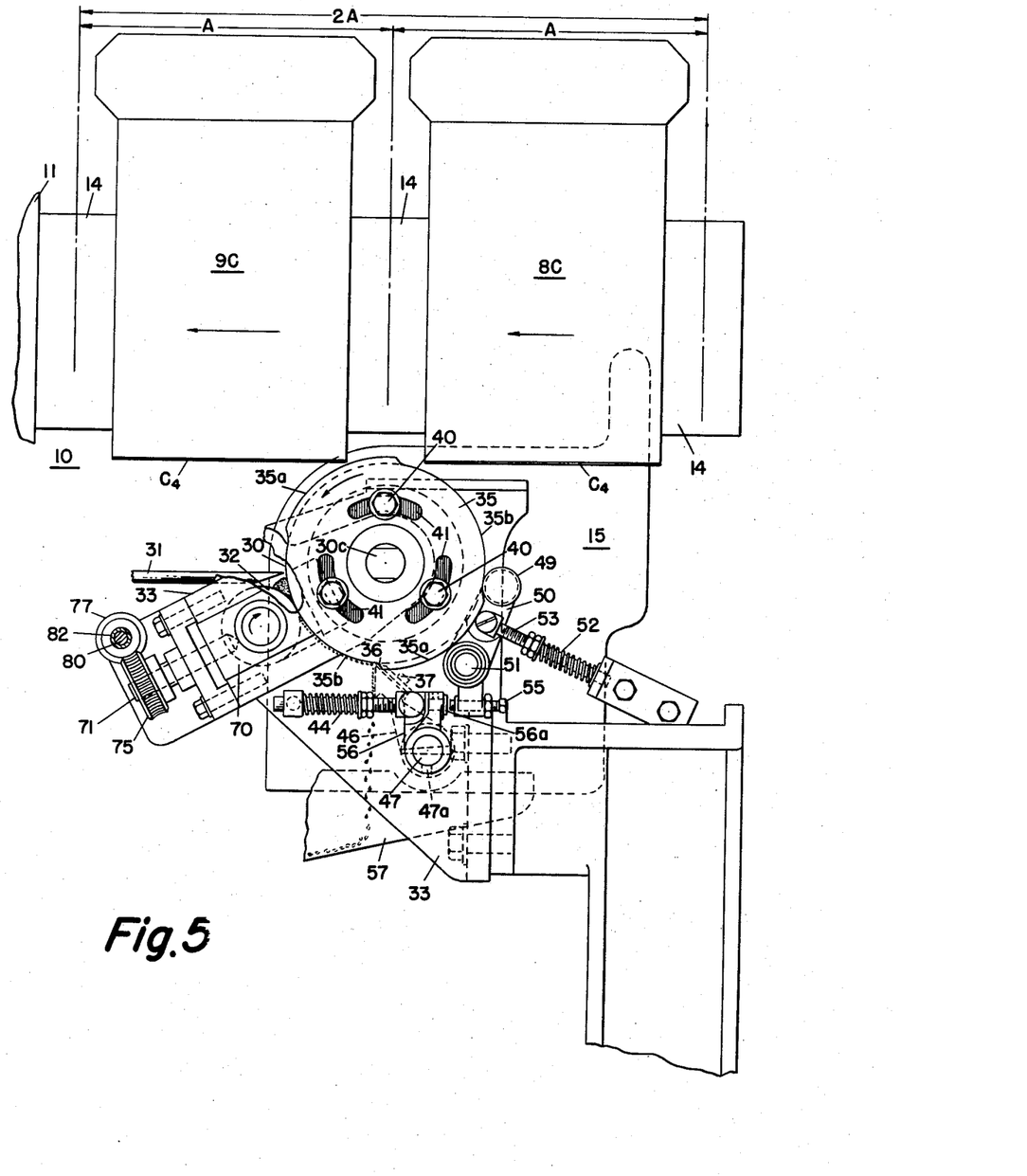
Fig. 5 is an enlarged elevational view of the selective gluing apparatus for the lower end flaps of cartons shown in Figs. 1 and 4.

The lower selective adhesive applying mechanism 15 for applying adhesive to the bottom flaps C3 and C4 of the cartons is supported by a bridge 19 separating drums 12 and 13, Fig. 1, and is shown in detail in Figs. 4 and 5. The cartons 8C and 9C are conveyed across the top of the adhesive applying or transfer roll 30 by means of the conveyor 10 including blocks 14 carried by belt 11. As later described, the roll 30 is continuously driven from motor 17 so that the velocity of its periphery is the same as the linear velocity of conveyor 10 and its cartons.

The pitch of the conveyor blocks 14 is represented by the reference character A and is equal to the distance between the centerlines of adjacent blocks 14, as shown in Figs. 2 and 5. Two pitches of the conveyor blocks 14 are equal to the distance 2A in Figs. 2 and 5: the circumference of the roller 30 has been selected to accommodate two conveyor block pitches and thus its circumference is equal to the distance 2A. Accordingly one revolution of the roller 30 is equal to two conveyor block pitches and thus it is necessary to apply two adhesive patterns to the periphery of the transfer roller 30.

Adhesive is delivered by way of a pipe 31, Fig. 5, to a pocket formed between the transfer roll 30 and a doctor roll 32, supported adjacent each other by bracket 33 which in turn is supported from the bridge 19. The adhesive may be supplied to pipe 31 by a suitable pumping device, not shown, which may be of the type fully described in said First et al., Patent No. 2,293,498. The doctor roll 32 is accurately adjustable with respect to transfer roll 30, as hereinafter described, to a selected distance from the periphery of transfer roll 30 so as to control the thickness of the coating of adhesive applied to the surface of transfer roll 30. The doctor roll 32 applies a film of adhesive uniformly across the length of portions 30a and 30b, Figs. 1 and 4, of the transfer roll 30. Provision has been made for removing the adhesive film or coating from the periphery of transfer roll 30 at selected or desired areas. The dimensions of said areas are controlled by a cam 35, rotatable with transfer roll 30, and the length of a scraper blade 36, as now to be described.

As shown in Figs. 4 and 5, the cam 35 is carried by an extension of shaft 30c of transfer roll 30 and it is adjustable about the shaft 30c by means of the bolts 40 that extend through the slots 41 in cam 35. The cam 35 is provided with a pair of raised portions 35a, 35a and a pair of lower portions 35b, 35b, and the total length of one portion 35a plus one portion 35b is equal to one pitch of the conveyor blocks 14, described above. Accordingly for a 180° rotation of cam 35, its cam surface will have traversed a distance of one pitch A of the conveyor blocks 14, this distance being the same as that traversed by the periphery of the transfer roll 30. Both the transfer roll 30 and cam 35 are driven in a counterclockwise direction as shown in Fig. 5. The doctor roll 32 is driven in a clockwise direction. The scraper blade 36 is normally held in engagement with the periphery of transfer roll 30 by means of a spring 44. As may be seen in Figs. 4 and 5 the scraper 36 extends transversely of roll 30, engaging portions 30a and 30b, and is carried by a bracket 46 pivotally supported on a rod 47.

To actuate the scraper 36 and move it out of engagement with transfer roll 30, thus preventing it from removing the film of adhesive at selected areas from the periphery of the transfer roll 30, there is provided a cam roller 49 supported adjacent cam 35 by arm 50. Arm 50 is pivotally carried at pivot 51 by bracket 33 and the cam roller 49 is held against the cam face including portions 35a and 35b under the pressure of a spring 52 that surrounds the pressure arm 53 connected to arm 50. When the cam roller 49 rides up onto one of the high portions 35a of cam 35, arm 50 is rotated in a clockwise direction about its pivot 51 causing the screw member 55 to move towards lever 56 secured to shaft 47 as by a set screw 47a, the same shaft that supports the scraper bracket 46.

It will be observed that the end of screw 55 in its normal position, Fig. 5, is spaced from the stop or pad 56a carried by lever 56. When the cam roller 49 moves up onto raised portion 35a of cam 35 the screw 55 is moved into engagement with the pad 56a after which screw 55 rotates bracket 56 in a counter-clockwise direction about the axis of shaft 47, and against the bias of spring 44. The scraper bracket 46 is slidably carried on shaft 47 and is releasably held for rotation with shaft 47 by means of a collar 58 having a pair of pins 59 extending into openings in the bracket 46. The bracket 46 is held against collar 58 by means of a compression spring 60 that abuts against one end of bracket 46 and a collar 61 fixed to shaft 47 as by a set screw 62, Fig. 4. When lever 56 is rotated about the axis of shaft 47 by the application of a force to pad 56a by screw 55 as above described, the collar 58 likewise is rotated in the same direction as lever 56 and rotates the scraper bracket 46 through pins 59 to move the scraper blade 36 out of engagement with the periphery of transfer roll 30. As long as roller 49 is in engagement with the raised cam portion 35a, the scraper blade 36 will be held out of engagement with transfer roll 30 thus allowing the adhesive coating to remain on the transfer roll 30.

Referring to Figs. 2 and 3, the dimension X represents the distance along the periphery of transfer roll 30 that adhesive is applied to the cartons and distance X is equal to the length of cam rise 35a. When cam roller 49 moves off of cam rise 35a down onto cam portion 35b, the lever arm 50 is rotated in a counterclockwise direction about the axis of pivot 51, thus moving the screw 55 away from its engagement with pad 56a thereby permitting lever arm 56 to rotate in a clockwise direction about shaft 47 under the pressure of spring 44. This clockwise rotation of shaft 47 by lever 56 and spring 44 is transmitted to the scraper bracket 46 through collar 58 and pins 59 to return the scraper blade 36 to its normal position, Fig. 5, against the periphery of the adhesive transfer roll 30. The scraper blade 36 remains against the transfer roll 30 as long as cam roll 49 engages the portion 35b of cam 35. Thus the adhesive is removed from the surface of transfer roll 30 for a distance corresponding to the length of cam surface 35b and as indicated in Figs. 2 and 3 this distance corresponds to the dimension Y. Since the cam surface 35a plus the cam surface 35b is equal to one-half of the circumference of the transfer roll 30, it will be seen that the sum of the dimensions X and Y in Figs. 2 and 3 likewise will be equal to one-half of the circumference of the transfer roll 30 and thus equal to dimension A.

As the cartons are moved over the lower selective adhesive applying mechanism 15, the outturned flaps C3 and C4 of each carton have transferred thereto the predetermined adhesive pattern, that has been applied to the surface of the adhesive conveyor or transfer roll 30. As aforementioned, the carton conveyor 10 is driven from a source of power 17, Fig. 1, at a predetermined linear speed. The surface of transfer roll 30 is driven at the same linear speed as the carton conveyor by means of the chain 64 and sprockets 65 and 66 that are in turn driven from the power source 17 through a suitable mechanical connection indicated by broken line 18. The adhesive that is scraped off the periphery of transfer roll 30 by the scraper blade 36 drips down onto a return-pan or glue trough 57, Fig. 5, which is provided with a return path, not shown, for returning the adhesive that has been scraped from the transfer roll 30 to the glue supply. By providing a sloping return path for the excess glue it may be returned to the glue supply by means of gravity for reuse.

The scraper blade 36 may be of any selected length, depending upon the size of cartons to which the pattern of adhesive is to be applied. The scraper blades may be easily changed by sliding the scraper bracket 46 to the right as shown in Fig. 4, thus compressing spring 60 and permitting the pins 59 carried by collar 58 to be disengaged from their corresponding openings in scraper bracket 46. The scraper bracket 46 may then be rotated in a counterclockwise direction away from the transfer roll 30 as viewed in Fig. 5. With the bracket 46 in this position the screws 37, Figs. 4 and 5, may be loosened and the scraper blade 36 removed from the bracket 46, and replaced by another scraper blade of different length. It will also be observed that with the scraper blade 36 and its bracket 46 in this position the machine may be operated and a continuous coating of glue will be applied to the transfer roll 30. Accordingly, it is possible to operate the machine and apply a continuous coating of glue to the carton flaps by making the foregoing simple adjustment. While such operation is possible this would normally not be desirable in view of the many advantages derived from applying adhesive only to selected or predetermined areas of the carton flaps as described above.

The cam 35 is provided with slots 41 so that the cam surfaces 35a and 35b may be adjusted about the axis of shaft 30c. This permits the adhesive pattern to be applied to the surface of roll 30 to be properly aligned with respect to the surfaces of the flaps C3 and C4 of the cartons to which the predetermined adhesive pattern is to be applied. In addition to varying the adhesive pattern by changing to different lengths of scraper blades the pattern may also be changed by varying the lengths of cam surfaces 35a and 35b. While the total length of 35a plus 35b will remain the same, that is equal to ½ of the circumference of the transfer roll 30, the length of cam portions 35a and 35b may be lengthened or shortened as long as a corresponding change is made in both cam surfaces. In other words if one cam surface is lengthened the other cam surface must be shortened by the same amount that the first cam surface is lengthened.

Figure 6:
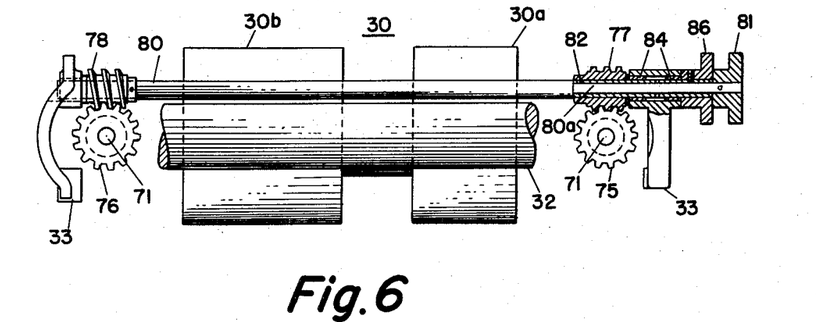
Fig. 6 is an elevational view of the doctor roll and associated mechanism shown in Fig. 5.

Referring to Figs. 5 and 6 there is shown an arrangement for accurately controlling the spacing between the doctor roll 32 and the transfer roll 30. The doctor roll 32 is supported at each of its ends by slide members 70 which are carried by brackets 33. The slide members 70 are adjusted toward and away from the transfer roll 30 by means of adjusting screws 71. One of adjusting screws 71 is provided with a gear-wheel 75 and the other is provided with a gear-wheel 76 each adapted to cooperate with corresponding worms 77 and 78 respectively. As may best be seen in Fig. 6, the worm 78 is fixed to a supporting shaft 80, the opposite ends of which are carried by brackets 33. Shaft 80 is provided with an adjusting knob 81 and thus the worm 78 may be rotated in turn rotating its associated gear-wheel 76 and screw 71 to move the corresponding end of doctor roll 32 toward or away from the transfer roll 30. The other worm 77 is secured to a sleeve 82 surrounding a reduced end 80a of shaft 80, the sleeve 82 being supported in a bearing 84, in bracket 33. An adjusting knob 86 is secured to the outer end of sleeve 82 and thus the worm 77 may be rotated independently of shaft 80 to rotate the corresponding gear-wheel 75 and its screw 71 to move the corresponding end of doctor roll 32 toward or away from the transfer roll 30. It will be observed that both the adjusting knobs 81 and 86 are disposed at the same end of shaft 80 and that they are closely adjacent each other so that they may be adjusted together or separately. The knobs 81 and 86 are disposed at the outside of the machine, and thus permit both ends of the doctor roll 32 to be adjusted readily by an operator without the necessity of the operator reaching into the interior of the machine to adjust the inner end of the doctor roll 32 adjacent the gear-wheel 76 and associated worm 78. The spacing between the doctor roll 32 and the transfer roll 30 must be accurately controlled in order to control the thickness of the film of adhesive to be applied to the transfer roll and subsequently applied by it to the flaps on the cartons.

The thickness of the film of adhesive will vary with different adhesives and the particular materials from which the cartons are made. It is important that the correct thickness of adhesive be applied to the transfer roll, as this will control how tightly the cartons are sealed. If too much adhesive is applied to the transfer roll 30 the adhesive will squeeze out from under the flaps when they are pressed down, thus causing the adhesive to run down the sides of the cartons and thus detract from the appearance of the cartons. Likewise if insufficient glue is applied to the transfer roll 30 the carton flaps will not receive a sufficient amount of glue to hold them in sealed relation when the carton is closed and thus there will be danger of the product being spilled from the cartons after passing through the machine.

In certain applications, it is desirable to apply a thicker coating of adhesive to the outer carton flap C4, Figs. 2 and 4, and thus it is necessary to adjust the end of doctor roll 32 adjacent transfer roll portion 30a to provide a greater spacing therebetween than between the other end of doctor roll 32 and adjacent portion 30b which transfers the adhesive pattern to the inner flap C3. The foregoing adjustments may be made by adjusting knobs 86 and 81 independently thus providing a thicker coating of adhesive on flap C4 for increased bonding strength.

It will be observed in Fig. 2 that the outer flaps C4 have an adhesive pattern applied to them such that the central area p is free of adhesive. This area corresponds to the area p' on transfer roll 27 from which adhesive has been removed. While the adhesive coated surface of flap C4 does not come into contact with the product in the cartons, it has been found that when adhesive is applied to area p no bonding results between this area and flap C3. Accordingly it has been found possible to remove the adhesive from area p resulting in a substantial saving in adhesive and thus a reduction in cost.

As previously mentioned transfer roll 30 is driven from the main drive of the machine by a mechanical connection including chain 64 and sprocket 65, the latter being fixed to journal 30d of roll 30. Provision has also been made for driving doctor roll 32 to aid in distributing the adhesive as it is applied to transfer roll 30. As shown in Fig. 4 a gear 42 is fixed to journal 30d. This gear meshes with a gear 43 fixed to the journal on doctor roll 32 thus providing for concurrent rotation of both transfer roll 30 and doctor roll 32.

As shown in Fig. 1 after the bottom flaps C3 and C4 of the cartons have been coated with adhesive and closed, the cartons are then filled at the filling station F. After the cartons leave the filling station F they are then ready to have adhesive applied to their top flaps C7 and C8 preparatory to sealing the complete carton. The top selective adhesive applying mechanism 16 is supported on bridge 19 and is shown in detail in Figs. 7–9. The filled cartons are moved by conveyor 10 beneath the transfer roll 90, including portions 90a, 90b, of the top adhesive applying mechanism 16, to which adhesive is applied in a similar manner to that previously described in connection with the transfer roll 30 of the bottom adhesive applying mechanism 15. In order to drive the peripheral surface of roll 90 at the same linear velocity as conveyor 10 and its cartons, the journal 90d of roll 90 has fixed thereto a sprocket 67 connected to a sprocket 68, Figs. 1 and 4, on journal 30d by a chain 69, Fig. 1. The transfer roll 90 is positioned adjacent a doctor roll 91, Fig. 9, and adhesive is fed therebetween by way of a funnel member 93 to which adhesive is supplied from a pipe 94 connected to the adhesive supply. The doctor roll 91 is concurrently rotated with roll 90 by means of the gears 95 and 97 carried by the corresponding journals of roll 90 and doctor roll 91, Fig. 7. The spacing of the doctor roll 91 with respect to the transfer roll 90 is controlled by a mechanism 96 similar to that described in connection with Fig. 6, with like parts being identified by the same reference characters. Accordingly it is unnecessary to repeat a detailed explanation of mechanism 96.

Figure 7:
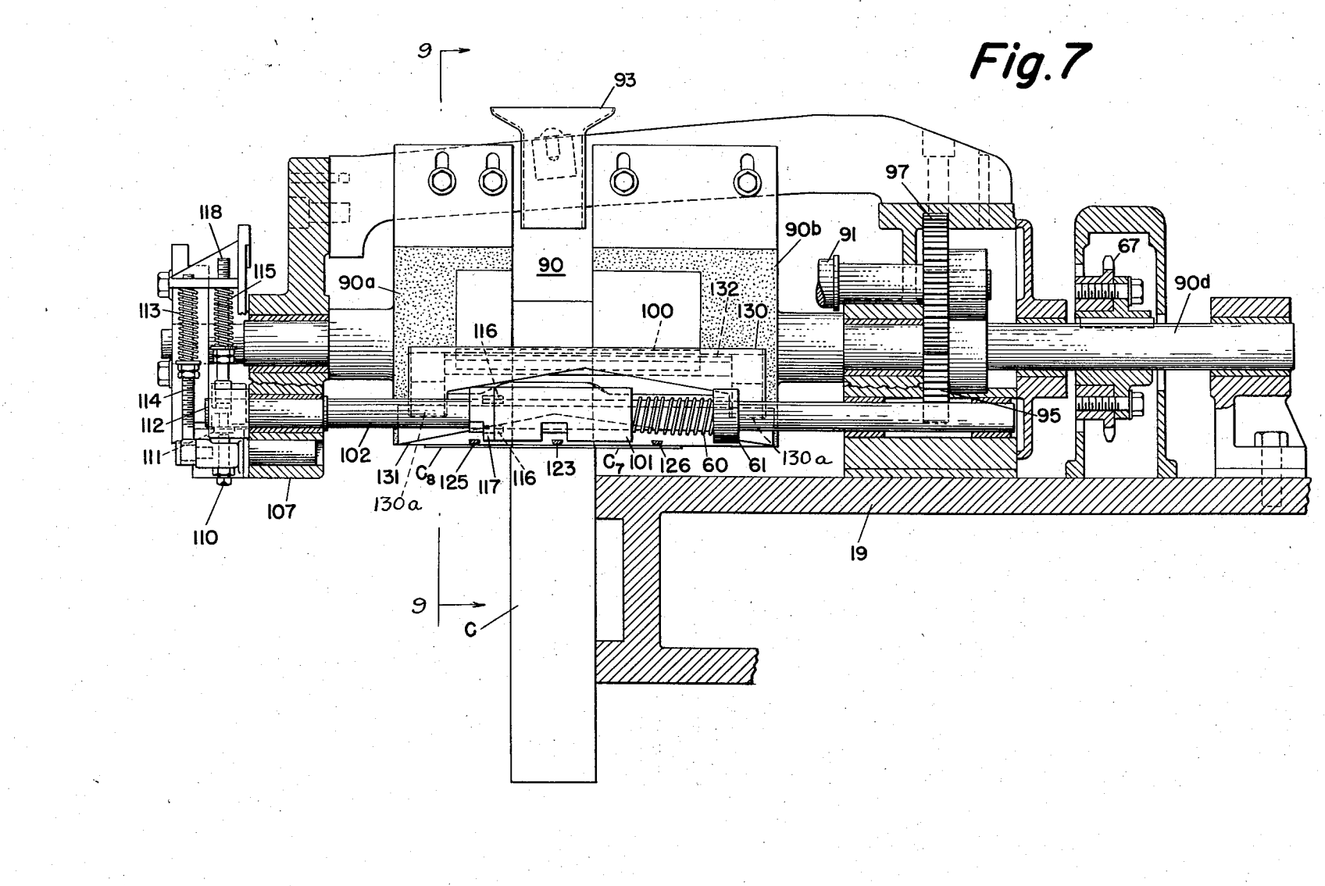
Fig. 7 is an enlarged sectional view of the selective gluing apparatus for the upper end flaps of cartons shown in Fig. 1.
Figure 8:
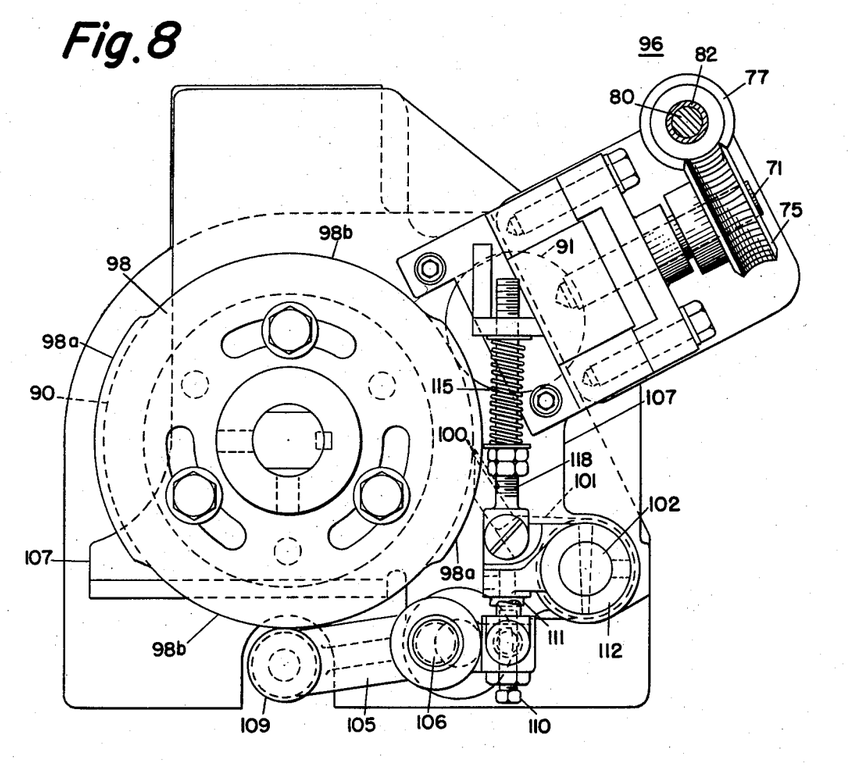
Fig. 8 is an enlarged elevational view of the selective gluing apparatus for the upper end flaps of cartons shown in Figs. 1 and 7.

The shaft extension of transfer roll 90 is provided with an adjustable cam 98, Fig. 8, having a pair of upper cam portions 98a and a pair of lower cam portions 98b. The cam portions 98a and 98b correspond to the cam portions 35a and 35b previously described. A scraper blade 100 for removing the adhesive from predetermined areas of portions 90a, 90b of transfer roll 90 is carried by a lever 101 disposed on shaft 102. A lever arm 105 is pivoted at 106 to a bracket 107, Fig. 7, that supports shaft 102 as well as the journals of the transfer roll 90 and doctor roll 91. The outer end of lever 105 is provided with a cam roller 109 that is adapted to engage the cam surfaces 98a and 98b. The lever 105 also carries adjustable screw member 110, an end of which is disposed in normally spaced relation to a button 111 carried by a lever 112 secured to shaft 102, Figs. 7 and 8. When the raised portion 98a on cam 98 engages cam roller 109 lever 105 is rotated against the bias of spring 113 on rod 114, Fig. 7, in a counterclockwise direction, Fig. 8, moving screw member 110 into engagement with button 111 and thus rotating lever 112 along with the lever 101 supporting scraper 100, in a clockwise direction about pivot 102 to move the scraper 100 against the bias of spring 115 out of engagement with the adhesive coated surface of transfer roll 90. Movement is transmitted from shaft 102 to lever 101 supporting scraper 100 through pins 116, Fig. 7, carried by collar 117 fixed to shaft 102. It will be noted that this construction is similar to that previously described in connection with the scraper and its supporting lever for the bottom adhesive applying mechanism 15 shown in Figs. 4 and 5. Scraper 100 remains out of engagement with the surface of the transfer roll 90 during the time interval that cam roller 109 engages the cam rise 98a. When the cam roller 109 moves off of cam rise 98a down onto cam portion 98b the scraper 100 will be returned into engagement with the surface of transfer roll 90 under the action of spring 115 carried by rod 118.

In similar manner to the operation of selective adhesive applying mechanism 15 for applying adhesive to the bottom carton flaps, the pattern of adhesive to be applied by transfer roll 90 in the upper adhesive applying mechanism 16 is determined by the length of the cam portions 98a and 98b of cam 98 and the length of the scraper 100. The dimensions of these elements may be changed to provide different adhesive patterns in the manner similarly described in connection with the lower selective adhesive applying mechanism 15 shown in detail in Figs. 4 and 5.

Figure 9:
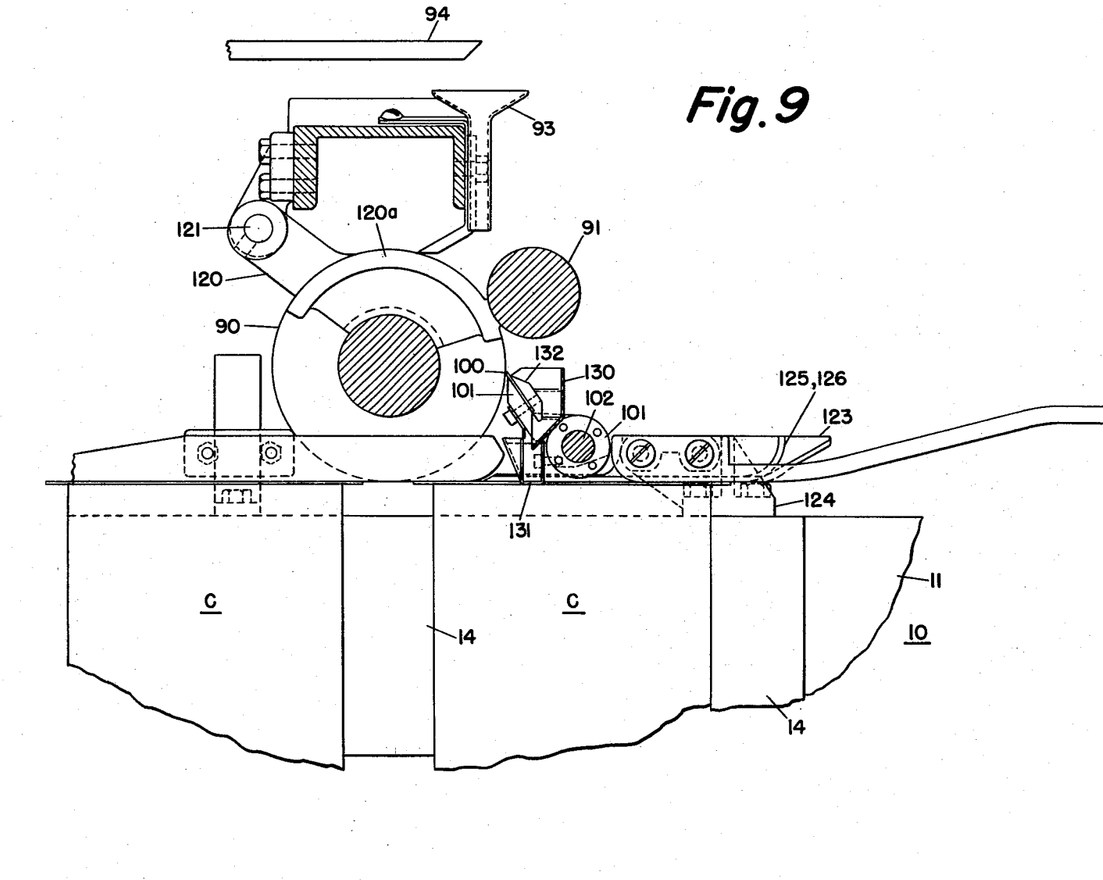
Fig. 9 is a sectional view taken along the lines 9—9 in Fig. 7.

As shown in Figs. 1 and 7, portions 90a and 90b of transfer roll 90 are separated by a distance corresponding to the width of the cartons C. The flaps C5 and C6 pass under this spaced portion of roll 90, and no adhesive is applied to these flaps. In order to prevent adhesive from flowing from funnel 93 onto the flaps C5 and C6, and also into the filled cartons, a stationary deflecting member 120, Figs. 1 and 9, is supported on stud 121 and extends between portions 90a and 90b of transfer roll 90. The deflecting member 120 has the additional function of wiping or scraping the inner vertical ends of portions 90a and 90b by its surfaces 120a to prevent any adhesive from accumulating on the ends of these portions thus avoiding any transfer of adhesive into the filled cartons. In order to hold the flaps C5 and C6 in their inturned positions as they pass under the upper selective adhesive applying mechanism 16 there is provided a flap control rod 123, Fig. 7, supported by a bracket 124, Fig. 9. There are also provided flap control rods 125 and 126, supported by bracket 124, for holding flaps C7 and C8 in their extended positions as shown in Fig. 7.

While flap control rods are not shown in Figs. 4 and 5 for the lower selective adhesive applying mechanism 15, similar arrangements are provided for holding flaps C1—C4 in the positions shown in Figs. 4 and 5. Similarly, the lower selective adhesive applying mechanism 15 is preferably provided with an adhesive deflecting member 127 between portions 30a and 30b of transfer roll 30, Fig. 1, for performing a similar function to that of member 120, i. e., preventing adhesive from being applied to flaps C1 and C2.

Figure 10:
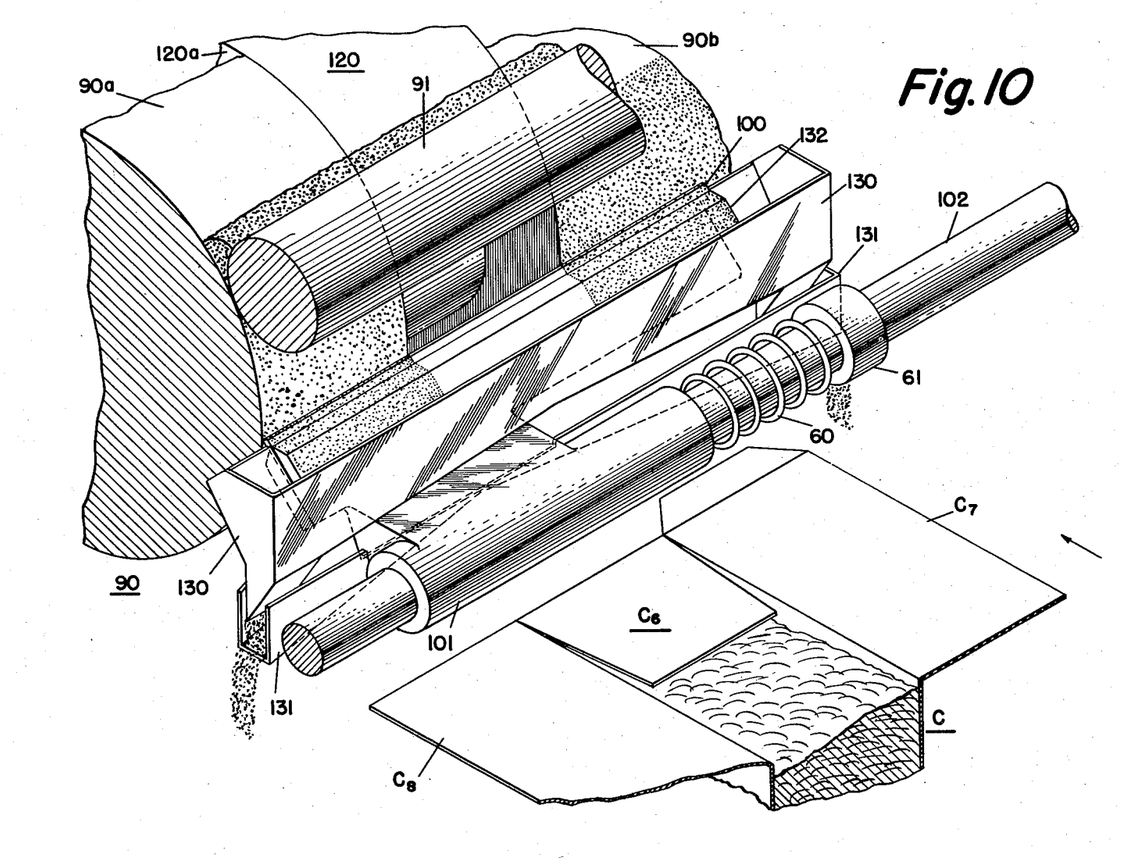
Fig. 10 is a fractional perspective view of the upper glue trough and scraper of Figs. 1, 7 and 9.

Referring to Figs. 9 and 10, it will be seen that the filled cartons pass in vertical position beneath the transfer roll 90 of the upper selective adhesive applying mechanism 16. As a certain amount of glue is scraped off of portions 90a and 90b of transfer roll 90 by scraper 100 to form the predetermined pattern of adhesive that is to be applied to flaps C7 and C8, it is necessary to prevent this excess glue from flowing into the filled cartons. Accordingly, as shown in Figs. 9 and 10, the scraper 100 and associated bridge type troughs 130 and 131 are all carried by lever 101. As the adhesive is scraped from the periphery of portions 90a and 90b of transfer roll 90 by scraper blade 100, it flows over clamp 132 and into the upper trough 130 which is fixed to clamp 132. It will be noted that trough 130 is of the bridge type and is so designed that the adhesive will flow to either side and through openings indicated at 130a, Fig. 7. After the adhesive leaves the openings 130a of trough 130, it flows into the lower trough 131 and is returned by gravity through pipes, not shown, to the glue supply tank. By providing the troughs 130 and 131 movable with scraper blade 100 as an integral unit, it is possible to prevent the adhesive that is scraped from the periphery of portions 90a and 90b of transfer roll 90 in forming the predetermined pattern from flowing into the cartons, thus avoiding contamination of the filled product.

While selective adhesive-applying mechanisms 15 and 16 have been described as operating on the bottom flaps and top flaps respectively of the cartons, it is to be understood that these mechanisms are adapted for operating on either end of the cartons depending upon how the cartons are fed into the machine. When cartons are fed into the machine in inverted position, the flaps C1—C4 will actually be the top flaps of the carton even though they are operated on by the bottom adhesive applying mechanism 15.

While in Fig. 2 the adhesive pattern applied to flaps C3 show adhesive being applied to the ears e by transfer roll 27, it is to be understood that these ears may be left free of adhesive and the adhesive applied thereto at a later location in the automatic cartoning system. For example, the adhesive may be applied to these ears by a subsequent gluing attachment added to the system after the carton turn-around conveyor shown in said Patent 2,293,498. The reason for subsequent gluing of the ears e is that some times during the filling operation some of the product is spilled and falls on these extended ears e, particularly the ears on the bottom end flaps C3. When the product contacts the adhesive-coated surface, it renders the adhesive ineffective for sealing purposes and thus additional adhesive is some times required in order to cause the ears e to be firmly bonded to the sides of the carton when the ears e are folded down on the pressure conveyor just prior to the cartons leaving the machine. Accordingly, rather than apply adhesive twice to these ears e, it may be preferable to prevent the adhesive from being applied to the ears e at mechanism 15 and also at mechanism 16 if desired. This may be accomplished by dividing each of the cam rises 35a into two spaced portions on cam 35, these portions being spaced by a distance corresponding to the distance between the ends of adjacent flaps C4 or, as shown in the example of Fig. 2, the width of an intermediate spacer block 14. In other words, rather than have the cam rise 35a be equal to the distance X as shown in Figs. 2 and 3, the cam rise may be divided into two portions separated by a low portion of a height corresponding to portions 35b, with the two spaced portions of rise 35a and its intermediate lower portion all adding up to equal the dimension X. Thus, the scraper will be permitted to engage the portions of the transfer roll 30 and remove adhesive from the portion that would normally apply adhesive to each of the ears e. A similar alteration can be made in the top selective adhesive-applying mechanism 16 if it is desired to provide a post-gluing attachment for applying adhesive to the flaps C7 on the upper end of the cartons. This may some times be desirable if the machine is being operated at well below its maximum speed and if a fast setting adhesive is being applied to the end flaps.

The last operation performed in sealing the carton is to press down the ears e, and if the machine is operating at a relatively low speed, there is a possibility that the adhesive on the ears e might become set before the cartons pass into pressing sections of the machine or system. If this occurs, it is then necessary to apply another coating of adhesive to the ears e in order to firmly bond them to the sides of the carton. Accordingly, in order to save the cost of applying two coats of adhesive to the ears e, it may be desirable to prevent adhesive from being applied to the ears e at either or both of the selective adhesive-applying mechanisms 15 and 16 and to apply the adhesive at a later location in the system. This will represent a substantial saving in cost of adhesive and also will assure that the ears will be tightly bonded to the cartons.

While a preferred embodiment of this invention has been described and illustrated, it shall be understood the invention is not limited to the specific arrangements shown and that changes and modifications may be made within the scope of the appended claims.

What is claimed is:

1. In a system for applying a predetermined adhesive pattern comprising adhesive areas spaced apart in the direction of advancement by a non-adhesive area to each article in a series of individual articles, a conveyor for supporting a succession of articles arranged on said conveyor in a spaced series of a given pitch, means for continuously driving said conveyor to advance the articles successively to and past an adhesive applying station at a predetermined linear velocity, an adhesive conveyor, and means for arranging adhesive of uniform thickness on said adhesive conveyor in pattern form at spaced locations having a pitch corresponding with that of the articles, the surface areas of said adhesive conveyor between said spaced locations being free of adhesive for a distance in the direction of advancement of the articles corresponding with the spacing of said spaced apart areas of the individual articles said adhesive conveyor being mounted adjacent to said article conveyor at said station and adapted to advance said adhesive in pattern form through said station at a linear velocity substantially the same as that of the articles to effect successive transfer of the predetermined adhesive pattern to the individual articles.

2. In a system for conditioning cartons preparatory to closing in avoidance of contaminating the filled product with adhesive, an endless conveyor for moving cartons each having a plurality of end flaps extending therefrom at opposite ends, and means including an adhesive applicator and cooperating scraper structure, said applicator having surfaces spaced apart a distance corresponding to the spacing between an opposed pair of end flaps for maintaining the first two flaps to be closed at an end of the carton free of adhesive, and said scraper structure being operable upon said spaced surfaces of said applicator for transfer of a predetermined pattern of adhesive to the last two flaps to be closed at an end of the carton so as to seal the cartons when the end flaps are closed while providing a substantially continuous non-adhesive surface at the inside of the carton, the predetermined pattern comprising spaced adhesive areas extending across said last two flaps to be closed at an end of said carton transversely of the direction of carton movement by said conveyor, the spacing between the said spaced adhesive areas being free of adhesive and being of controlled dimension at least as great as the gap between said first two flaps by said scraper structure operating in timed relation to movement of the cartons by said conveyor.

3. In a system according to claim 2, wherein said last-named means comprises mechanism disposed in spaced locations along said endless conveyor, the mechanism at the one location being adapted to apply the predetermined pattern of adhesive to the end flaps at the bottom of the cartons, and the mechanism at another location being adapted to apply the predetermined pattern of adhesive to the end flaps at the top of the cartons after the carton has been filled.

4. In a system according to claim 3 wherein said mechanism adapted to apply the predetermined pattern of adhesive to the end flaps at the top of the container includes trough structure for receiving the excess adhesive removed by said scraper structure to form said predetermined pattern, said trough structure being movable with said scraper as the latter is moved into and out of engagement with said adhesive applicator.

5. The combination set forth in claim 4, wherein said trough structure comprises a pair of bridge type troughs supported one below the other beneath said scraper structure.

6. Mechanism for applying adhesive to selected areas of individual articles spaced in accordance with a predetermined pitch comprising transfer structure including two spaced rotating cylindrical surfaces each having a circumference equal to a plurality of full pitches for receiving adhesive thereon, means for applying adhesive to said surfaces, means for feeding the articles into engagement with said surfaces in accordance with said predetermined pitch, scraper structure operating in timed relation to said article-feeding means for repeatedly removing adhesive from said surfaces at the same areas located centrally of each pitch area and between areas of said surfaces which subsequently engage said selected areas of said articles, said surfaces transferring adhesive to said selected areas of said articles while maintaining free of adhesive the areas of said articles disposed between said selected areas, deflecting structure disposed adjacent said transfer structure for preventing adhesive from flowing between said surfaces resulting from application of adhesive to said surfaces by said adhesive-applying means, and means for varying the timing of said scraper structure to obtain different adhesive patterns on said articles.

7. In a system for filling and closing cartons, mechanism for applying adhesive to selected areas of carton flaps while maintaining the areas therebetween in the direction of feed free of adhesive comprising transfer structure including two spaced transfer surfaces for receiving adhesive thereon for transfer to the carton flaps, means for applying adhesive to said transfer surfaces, means for feeding the cartons with their flaps extended into engagement with said transfer surfaces, scraper structure operating in timed relation to said carton-feeding means for removing adhesive from said transfer surfaces except from areas which subsequently engage said selected areas of said cartons, said scraper structure being constructed and operated to direct the removed adhesive away from said transfer surfaces to prevent an increased build-up of adhesive on said transfer surface areas which engage said selected areas of said carton flaps, deflecting structure disposed adjacent said transfer structure for preventing adhesive from flowing between said transfer surfaces resulting from application of adhesive to said transfer surfaces by said adhesive-applying means, and means for controlilng the operation of said scraper structure to predetermine the adhesive patterns to be applied to said carton flaps.

8. A system according to claim 7 wherein said cartons are fed in vertical position by a continuously driven conveyor and there is provided additional adhesive deflecting structure cooperating with said scraper structure for preventing adhesive from falling into the cartons.

9. In a system for filing and closing cartons according to claim 7 wherein said means for feeding the cartons with their flaps extended into engagement with said transfer surfaces comprises a continuously driven conveyor, said cartons being supported on said conveyor in vertical position with a first pair of said carton flaps folded in open position and a second pair of said carton flaps folded in closed position between said first pair, said first pair being moved by said conveyor into engagement with said transfer surfaces to receive said adhesive pattern and said deflecting structure preventing deposit of adhesive on said second pair.

10. In a system for conditioning cartons preparatory to closing in avoidance of contaminating the filled product with adhesive, an endless conveyor for moving cartons each having a plurality of end flaps extending therefrom at opposite ends, a transfer member, means for applying adhesive to said transfer member, scraper structure operating to remove adhesive from said transfer member in accordance with a predetermined pattern, and means for maintaining the first two flaps to be closed at an end of the carton free of adhesive during the application by said transfer member of the predetermined pattern of adhesive to the last two flaps to be closed at an end of the carton so as to seal the cartons when the end flaps are closed while providing a substantially continuous non-adhesive surface at the inside of the carton, the predetermined pattern comprising spaced adhesive areas extending across said last two flaps to be closed at an end of said carton transversely of the direction of carton movement by said conveyor, the spacing between the said spaced adhesive areas being free of adhesive and being of controlled dimension at least as great as the gap between said first two flaps by said scraper structure operating in timed relation to movement of the cartons by said conveyor.

11. In a system for conditioning cartons preparatory to closing in avoidance of contaminating the interior of the cartons with adhesive, an endless conveyor for moving in succession cartons each having opposed pairs of end flaps extending therefrom, a rotatable adhesive applicator disposed to one side of said conveyor and adapted to engage a pair of opposed end flaps of each carton, scraper structure cooperating with the surface of said adhesive applicator prior to engagement of said surface with the end flaps of the carton to predetermine the pattern of adhesive on said surface and to be transferred to the end flaps on the carton, said surface being divided into sections which are spaced apart in a direction transversely of the path of movement of said conveyor a distance corresponding to the transverse dimension of the cartons to maintain the other opposed pair of end flaps free of adhesive, and means effective between said sections of said surface for preventing transfer of adhesive from said surface to the interior of the cartons.

12. In a system according to claim 11 wherein said endless conveyor includes structure for moving the cartons in a spaced series of a given pitch and wherein said adhesive applicator surface has a circumference at least as great as two full pitches of said cartons whereby said scraper structure can apply another predetermined adhesive pattern to said adhesive applicator while the latter is transferring a predetermined adhesive pattern to the end flaps of a carton.

References Cited in the file of this patent

UNITED STATES PATENTS

| | | |
|---|---|---|
| 491,861 | Smith | Feb. 14, 1893 |
| 1,277,939 | Juengst | Sept. 3, 1918 |
| 1,555,892 | Taylor | Oct. 6, 1925 |
| 1,580,829 | Lengel | Apr. 13, 1926 |
| 1,830,316 | Ettl | Nov. 3, 1931 |
| 1,932,989 | Rider | Oct. 31, 1933 |
| 1,936,136 | Lindgren | Nov. 21, 1933 |
| 1,990,637 | Daller | Feb. 12, 1935 |
| 2,077,470 | Federwitz | Apr. 20, 1937 |
| 2,097,428 | Bergstein | Nov. 2, 1937 |
| 2,102,984 | Von Hofe | Dec. 21, 1937 |
| 2,130,786 | Bergstein | Sept. 20, 1938 |
| 2,246,126 | Davies | June 17, 1941 |
| 2,257,261 | Knowlton | Sept. 30, 1941 |
| 2,293,498 | First et al. | Aug. 18, 1942 |
| 2,341,845 | Mark et al. | Feb. 15, 1944 |
| 2,525,920 | Mackey | Oct. 17, 1950 |
| 2,596,225 | Eaton et al. | May 13, 1952 |